United States Patent [19]
Ciolli

[11] 3,727,941
[45] Apr. 17, 1973

[54] AUTOMOBILE LEVELIZER CONTROL UNIT

[75] Inventor: Henry J. Ciolli, Utica, Mich.

[73] Assignee: General Motors Corporation, Detroit, Mich.

[22] Filed: Dec. 8, 1971

[21] Appl. No.: 205,834

[52] U.S. Cl. .............................. 280/124 F, 267/65 D
[51] Int. Cl. ................................................ B60g 17/10
[58] Field of Search ...................... 296/124 F, 124 R; 267/65 D, 65 R; 280/DIG. 1

[56] References Cited

UNITED STATES PATENTS

| | | | |
|---|---|---|---|
| 3,633,935 | 1/1972 | Boyer | 280/124 F |
| 3,603,612 | 9/1971 | Hill | 280/124 F |
| 3,558,154 | 1/1971 | Jackson | 280/124 F |

Primary Examiner—Philip Goodman
Assistant Examiner—John A. Carroll
Attorney—W. S. Pettigrew et al.

[57] ABSTRACT

In preferred form, a vehicle leveling system having a load supporting device connected to a fluid supply system including first and second solenoid operated valves therein to control flow of leveling fluid to and from the load supporting device. The solenoid operated valves are controlled by a transistorized control circuit and a plurality of minireed switches therein located in a step-by-step relationship and operated by a permanent magnet movable relative to the minireed switches upon relative movement between the sprung and unsprung masses of the vehicle.

4 Claims, 5 Drawing Figures

INVENTOR.
Henry J. Ciolli
BY
J.C. Evans
ATTORNEY

INVENTOR.
Henry J. Ciolli
BY
J.C. Evans
ATTORNEY

AUTOMOBILE LEVELIZER CONTROL UNIT

This invention relates to vehicle leveling systems and more particularly to vehicle leveling systems which have a fluid supply connected to a variable volume load supporting device by valve means wherein the valve means are operated by an electrical controller in response to relative movement between the sprung and unsprung mass of a vehicle.

In vehicle leveling systems a load supporting auxiliary spring often is included which has a first and second portion thereon connected between the sprung and unsprung mass of a vehicle. For example, a pneumatic spring with a variable volume pressurizable chamber can have one end thereof connected to the chassis of a vehicle and the opposite end thereof connected to the axle housing at the rear of the vehicle. In such systems, a height sensing device is included to regulate the amount of pressurizable fluid either being directed into or exhausted from the variable volume chamber of the pneumatic spring to maintain a predetermined height relationship between the chassis and the rear axle of the vehicle.

In many instances the height sensing device is directly coupled between the sprung and unsprung mass of the vehicle. This requires mechanical ties and adjustments which must be made during the assembly of the leveling system on the vehicle.

An object of the present invention is to provide a reliable vehicle leveling system which eliminates the need for mechanical ties between a reference point on the vehicle and a portion of the vehicle which moves with respect to the reference point thereon.

Still another object of the present invention is to provide an electrically controlled vehicle leveling system having solenoid operated valves located between a fluid pressure source and the variable volume pressurizable chamber of a load supporting auxiliary spring device which is located between the sprung and unsprung mass portions of a vehicle to maintain a height relationship therebetween wherein the operation of the valves are controlled solely by means of electrical components which eliminate the need for mechanical ties between a reference point and a movable portion of a vehicle.

Still another object of the present invention is to provide an improved electrically controlled vehicle leveling system having a plurality of movable switch components operated in sequence in response to relative movement between the sprung and unsprung mass of a vehicle to condition valve means for a fluid leveling circuit to produce a fill or an exhaust phase of operation and to do so by means including a solid state control switch and a time delay capacitor discharge circuit which prevents energization of the valves in response to ordinary road movements between the sprung and unsprung mass of the vehicle.

These and other objects of the present invention are attained in one working embodiment which includes a plurality of spaced apart minireed switches located at a reference point on the vehicle suspension. A permanent bar magnet on a movable portion of the vehicle suspension moves with respect to the minireed switches to produce a step-by-step sequence of controller operation and a vehicle leveling sequence that will maintain a predetermined height relationship between the unsprung and sprung mass of a vehicle.

A control circuit includes a first and second coil energization circuit each having an on-off transistor and a silicon controller rectifier in series with the on-off transistor.

The on-off transistors are initially forward biased when the bar magnet is moved within close proximity to all of the minireed switches.

A resistance capacitor timing circuit is simultaneously maintained conductive under the control of a first and second transistor to produce a control signal. Means are provided to direct the control signal to the silicon controlled rectifier only following a predetermined time delay to prevent ordinary road movements operating the minireed switches to initiate a leveling operation. Following the delay, the system will operate to direct fluid to a leveler unit to raise the vehicle.

The circuit further includes a pair of the minireed switches that are operated by the bar magnet when the sprung mass of the vehicle or vehicle chassis is unloaded and moved by the primary suspension springs of the car to a point above a desired predetermined height relationship with the rear axle housing of the vehicle. This pair of minireed switches is located in circuit relationship with the coil energization circuit and the time delay circuit components so that only one of the coils will be energized when the vehicle is maintained above the desired predetermined height relationship. Under these conditions the other of the minireed switches will operate the time delay capacitor discharge circuit components to initiate a time delay phase of operation which prevents normal road movements from operating the fill and exhaust components in the fluid supply system. Following the time delay the system will operate to exhaust fluid from the leveler to lower the vehicle.

The provision of a separate permanent bar magnet and a plurality of sequentially arranged minireed switches eliminates the need for mechanical connections or direct mechanical ties between the reference point and a movable portion of a vehicle suspension. Moreover, the system has a high reliability since the drive currents for the on-off transistors in the circuit are very small thereby prolonging the life of the reed-switch components in the system.

Further objects and advantages of the present invention will be apparent from the following description, reference being had to the accompanying drawings wherein a preferred embodiment of the present invention is clearly shown.

Figure 1:
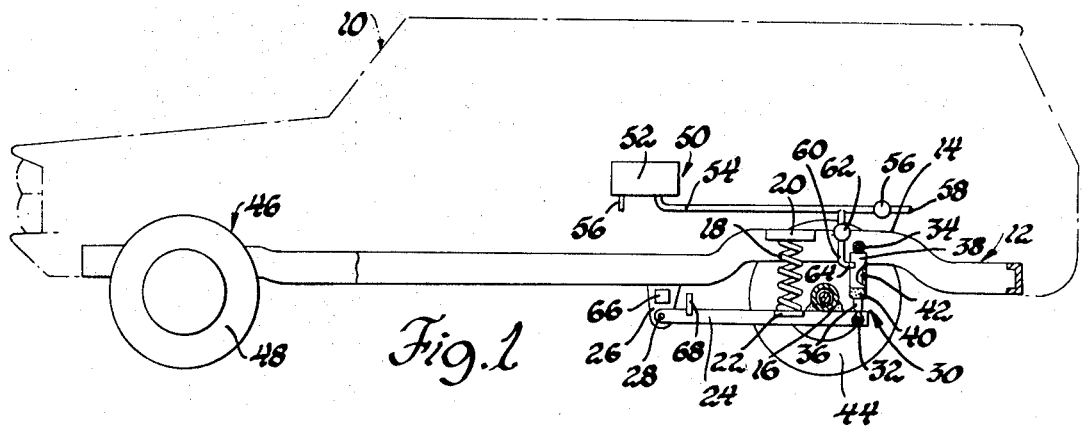
FIG. 1 shows a diagrammatically illustrated vehicle which includes a leveling system suitable for use with the present invention.

Referring now to the drawings, in FIG. 1 a vehicle 10 is illustrated which has a rear suspension 12 including a sprung portion represented by a chassis frame 14 and an unsprung portion represented by a rear axle housing 16.

In the arrangement of FIG. 1, one-half of the rear suspension 12 is illustrated. It includes a primary suspension spring 18 having one end thereof supported by a bracket 20 on the chassis frame 14 and the opposite end thereof supported on a bracket 22 on a control arm 24 which is fixedly secured to the axle housing 16.

The control arm 24 has one end thereof pivotally connected to a frame bracket 26 by means of a pin 28 and the opposite end thereof pivotally connected to one end of an auxiliary load supporting device 30 by means of a pin 32.

The upper end of the load supporting device 30 is connected by a bolt or pin 34 to the chassis frame 14.

More particularly, the auxiliary load supporting device 30 includes a lower portion 36 and an upper portion 38. The lower portion 36 is movable with respect to the upper portion 38 and is joined thereto by means of a flexible sleeve member 40 which cooperates with means including the upper portion 38 to define a variable volume pressurizable chamber 42 into which a pressurizable fluid can be filled or exhausted.

Depending upon the pressure within the chamber 42 the device 30 will produce a resultant load supporting uplifting force between the control arm 24 and the sprung chassis frame 14 which supplements the load supporting force of the coil spring 18.

In the vehicle 10 a like coil spring and load supporting device (not illustrated) are found on the opposite side of the rear suspension 12.

The rear suspension includes ground engaging wheels on opposite sides thereof. One wheel and tire assembly is illustrated at 44 in FIG. 1.

The vehicle also includes a front suspension 46 including a ground engaging tire and wheel assembly 48 which is operatively connected to the front end of the chassis frame 12 by conventional means.

In accordance with certain principles of the present invention, the auxiliary load supporting device 30 is operatively connected with a fluid supply system 50 which is representatively illustrated as being a tank of pressurized air 52 that has a discharge conduit 54 connected thereon.

It further includes an inlet fitting 56 for input of air into the pressurized tank 52.

The discharge conduit 54 is connected through a first normally opened solenoid operated valve 56 to an exhaust line 58. It is also connected to an exhaust and fill line 60 which includes a normally closed solenoid operated valve 62 therein.

The exhaust and fill line 60 is connected through a fitting 64 in the upper portion 38 of the auxiliary load supporting device 30. A branch line, not shown, is adapted to connect the discharge conduit 54 to a like load supporting device on the opposite end of the rear suspension 12 (not illustrated).

Figure 2:
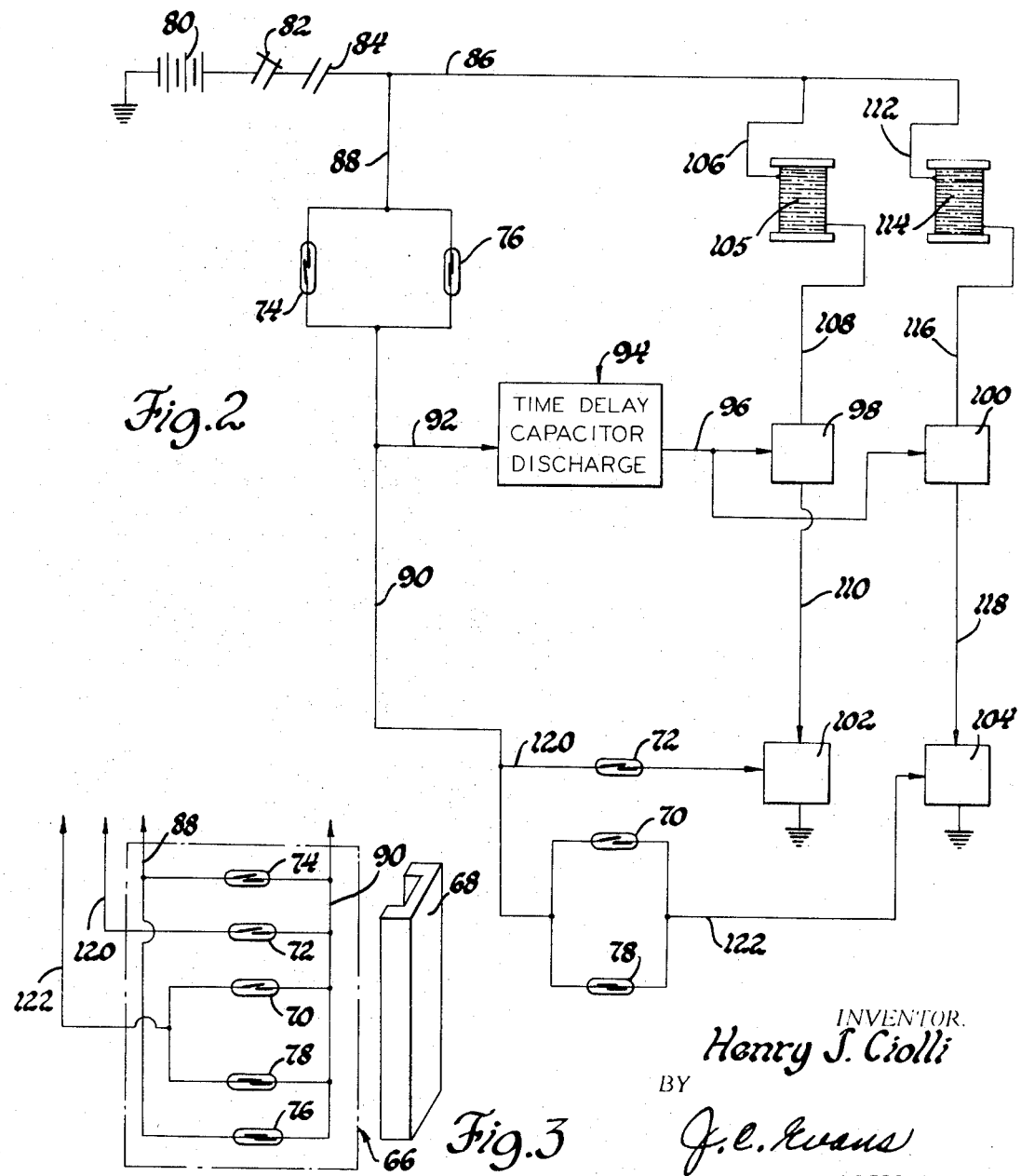
FIG. 2 is a block diagram of an electronic system for controlling the operation of the leveling system in FIG. 1.

Referring now to FIG. 2, the preferred embodiment for operating the leveling system of FIG. 1 includes a cluster of minireed switches 66 which are connected to a suitable reference point in the rear suspension 12 such as on the bracket 26. They are located with respect to an elongated bar magnet 68 connected to a suitable movable point on the suspension 12 for example the control arm 69.

By virtue of this arrangement, there is relative movement between the reed cluster 66 and the bar magnet 68 to produce a sequence of switching operations to be discussed.

In preferred form, the magnet 68 is a permanent magnet of a horseshoe bar configuration for operating each of the minireed switch components in the cluster 66 when located in close proximity thereto.

The cluster 66 more particularly includes a first series of minireed switches that are normally opened. This includes a switch 70 located below a second switch 72 which is located below a third switch 74.

The cluster further includes a second series of normally closed reed switches including a switch 76 and a switch 78. The first and second series of switches are shown in block form in FIG. 2.

The vehicle includes a power source represented by the battery 80 which is electrically connected by means of a high pressure cut-off switch 82 and a low pressure minimum retention switch 84 to a conductor 86.

The conductor 86 is connected to a branch conductor 88 to one side of a parallel circuit including the minireed switch 74 on one side thereon and the miniswitch 76 on the opposite side thereof.

The minireed switches 74, 76 serve as a height responsive control between conductor 88 and the conductor 90 which is connected by means of a branch conductor 92 to one side of a time delay capacitor discharge circuit 94.

An output signal from the discharge circuit 94 is directed through a conductor 96 to a pair of control switching devices 98, 100 which are in the form of a silicon controller rectifier.

The circuit further includes a pair of on-off bias switches 102, 104. A resistor 101 is connected to the base of switch 102. A resistor 103 is connected to the base of switch 104.

The control switch 98 and the on-off control switch 102 are series connected to a coil 105.

The solenoid coil energization circuit is from battery 80 through the high pressure switch 82, the low pressure retention switch 84 then through conductor 86 and a lead conductor 106 which is connected to one side of the coil 105. The opposite side of the coil 105 is connected by a conductor 108 to the anode terminal of the silicon controlled rectifier 98. It has the cathode terminal thereof connected by a conductor 110 through the switch 102 to ground.

The control switch 100 and the on-off switch 104 are components in a second solenoid coil energization circuit from the battery 80 which is made up in part by the high pressure switch 82, the low pressure switch 84 thence through the conductor 86 and a lead terminal 112 to the solenoid coil 114.

A conductor 116 connected to the opposite end of the coil 14 is connected to the anode terminal of the silicon controlled rectifier 100. It has its cathode terminal connected by a conductor 118 to one side of the switch 104 which has the opposite side thereof connected to ground.

The on-off switch 102 is controlled by means of the minireed switch 72 which is electrically connected by conductor 120 between the input conductor 90 and a control terminal for the switch 102. Likewise, the switch 104 is controlled by the minireed switch 70 and the minireed switch 78 located in parallel circuit relationship. A conductor 122 electrically connects them between the input conductor 90 and a control terminal for the on-off switch 104.

Figure 5:
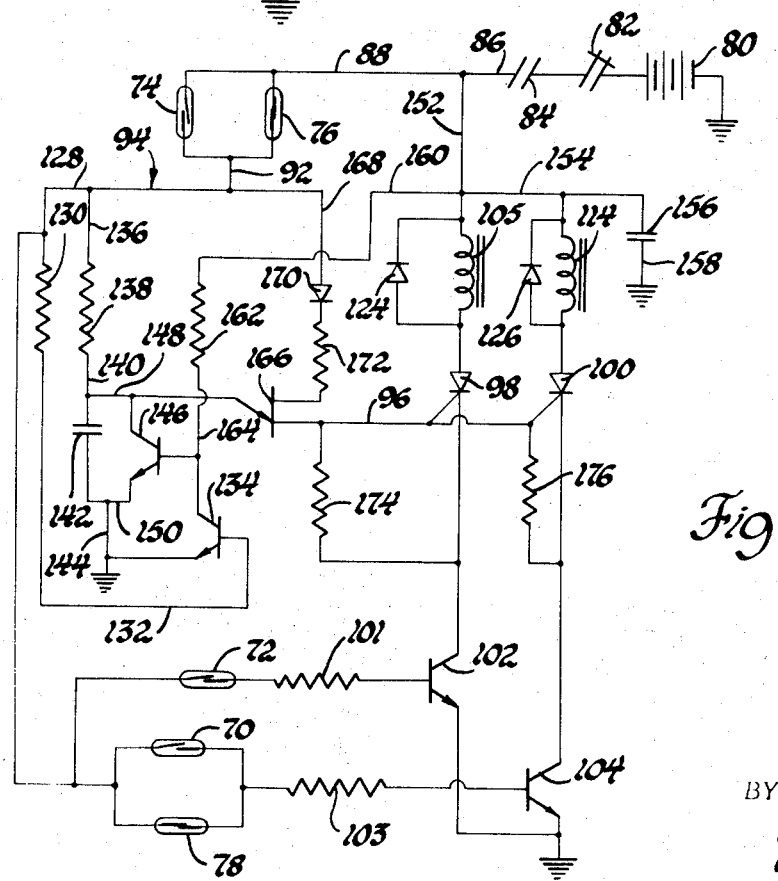
FIG. 5 is an electrical circuit diagram showing the circuit components of the embodiment shown in block form in FIG. 2.

The circuit components in this arrangement are more specifically illustrated in FIG. 5 wherein like components carry like reference numerals.

Coils 105, 114 are shunted by diodes 124, 126 respectively which prevent high inverse voltage transients across transistors 102, 104 which would cause damage to them.

The time delay capacitor discharge circuit 94 includes a conductor 128 electrically connected to one end of a resistor 130 which has the opposite end thereof connected by conductor 132 to the base of a switch transistor 134.

The circuit further includes a conductor 136 connected to one end of a resistor 138 having the opposite end thereof connected by a conductor 140 to the positive terminal of a capacitor 142.

The negative terminal of the capacitor 142 is electrically connected through a conductor 144 to ground to complete a charging circuit for the capacitor 142.

The charging circuit is controlled by a transistor 146 which has its collector electrically connected to a conductor 148 on one side of the capacitor. It has its emitter terminal connected by conductor 150 to conductor 144 thence to the emitter terminal of the on-off switching transistor 134.

A conductor 152 from battery 80 is connected by a branch conductor 154 to a capacitor 156 which is connected to ground by conductor 158. A second branch conductor 160 electrically connects the conductor 152 to one side of a resistor 162 which has the opposite side thereof electrically connected by conductor 164 to the base of transistor 146 and to the collector of transistor 134.

The conductor 148 serves as a current path for a signal from the time delay circuit 94. The signal is directed therethrough to the base emitter junction of a unijunction transistor 166, the collector of which is electrically connected from the power source through the conductor 92 thence through a conductor 168, a diode 170 and a resistor 172.

The base emitter junction of the transistor 166 is electrically connected to the control terminals of the silicon controlled rectifiers 98, 100 by the conductor 96. A resistor 174 is connected across the base emitter junction of unijunction transistor 166 and the cathode terminal of the silicon controlled rectifier 102. A resistor 176 is electrically connected across the base emitter junction of unijunction transistor 166 and the cathode terminal of the silicon controlled rectifier 100.

In accordance with certain principles of the present invention, height changes in the vehicle that are produced by changes of load thereon are sensed and corrected by means that eliminate the requirement for mechanical ties between the reference and moving portion of the vehicle suspension.

Furthermore, the system includes operational phases wherein the leveling action of the device 30 is delayed for at least 10 seconds in order to avoid cycling the system in response to ordinary car movements between the sprung portions of the vehicle including the chassis frame 14 and the unsprung portions of the rear suspension 12.

The operation of the vehicle is as follows:

Normal Level Condition

Figure 3:
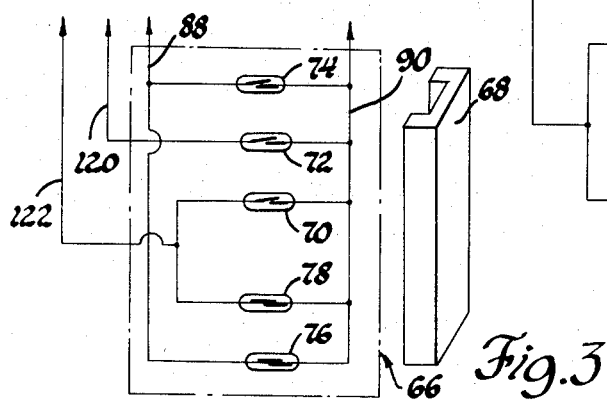
FIG. 3 is a diagrammatic showing of a magnetic operator and minireed switch components of FIG. 2.

Under normal level conditions, the minireed switches 70, 72, 74 are located out of proximity with the bar magnet 68. They are normally open switches and thence are maintained in an open position as illustrated in FIG. 3. At the same time, the minireed switches 76, 78 are located in close proximity to the bar magnet 68. They are normally closed switches and this location causes them to be also maintained in an open position. Under these conditions the transistor 146 is biased to maintain the capacitor 142 discharged.

As the car is loaded, the rear portion of the chassis frame 14 goes down and the bar magnet 68 is moved closer to the minireed switches 70, 72 and 74. The bar magnet closes the minireed switches 70, 72 and 74. This completes a control circuit from the power source to the base of the on-off switching transistors 102, 104.

When the bar magnet 68 closes the minireed switch 74, it completes a circuit from the supply conductor 86 and conductor 88 through the switch 74, through conductor 92, conductor 128, resistor 130 and conductor 132 to the base of the transistor 134. This forward biases the transistor 134 to shut off the transistor 146. When this occurs, the capacitor 142 is no longer shunted and it is charged through resistor 138.

The resistance capacitor characteristics of these components are such that there is a ten second delay before a sufficient charge is built up on the capacitor 142 to maintain a voltage differential between the collector and base emitter junction of the unijunction transistor 166 to cause the unijunction transistor 166 to fire. When the unijunction transistor 166 fires it directs a signal to the control terminal of the silicon controlled rectifiers 98, 100 causing them to be energized.

The aforedescribed ten second time delay will prevent leveling operation in response to normal vehicle movements. The control signal will thereafter initiate either a fill or exhaust phase of operation.

Fill Phase of Operation

Since the on-off transistors 102, 104 were previously energized, the solenoid energization circuits previously described are immediately energized following the time delay. When the solenoid coils 104, 114 are energized, the valve 56 will be closed and the valve 62 will be opened thereby to directly connect the pressurized fluid in the supply 52 to the variable volume control chambers 42 of the auxiliary load supporting devices 30. This will produce a resultant uplifting force on the chassis frame 14 which will cause the car to start to rise.

As the car starts to rise, the bar magnet 68 moves away from the minireed switch 74. This removes the drive current from the base of the transistor 134 causing it to be maintained non-conductive. This activates the transistor 146 causing the capacitor 142 to discharge through conductor 148 thence through the transistor 146 and the conductor 144 to ground. Simultaneously, the drive voltages through the minireed switches 70, 72 are removed to shut off the transistors 102, 104. This in turn de-energizes solenoid valve coils 104, 114 to maintain the valve 56 normally opened and the valve 62 normally closed to stop the leveling action.

Exhaust Phase of Operation

When the rear section of the car is unloaded, the main suspension springs 18 will cause the chassis frame 14 to move upwardly from the axle housing 16. During this phase of operation the first cluster of minireed switches 70 through 74 are normally opened. The normal operation phase of the minireed switches 76, 78 is to be maintained open by the close proximity location of the bar magnet 68. The upward movement will cause the bar magnet to move away from the minireed switch 78. This completes the control signal circuit to the base of the on-off transistor 104 to turn it on. Further motion of the bar switch 68 in this direction will cause it to move away from the reed switch 76 to open it and thereby again define a charge circuit from the power source to the capacitor 142. After the delay period of the circuit 94, the unijunction transistor 166 will again fire to activate both of the solenoid coils 104, 114.

At this point only on-off switch transistor 104 is turned on to energize coil 114. When this occurs, the valve 62 is conditioned to be opened and the pressurizable control chambers 42 of the supplemental load supporting device 30 are exhausted. This reduces the uplifting force on the rear portion of the chassis frame 14 and it will thereby be lowered to a point where the bar magnet 68 will again assume its normal relationship with the minireed switch cluster at which point the solenoid coil 114 is de-energized to drop out the exhaust solenoid valve and to again stop the leveling action.

By having a bar magnet activating the reed switch, mechanical ties are eliminated between the reference and moving portions of the vehicles rear suspension.

A further advantage of this circuit is that the drive currents for the on-off transistors 102, 104 are very small. Thus, the life of the components of the minireed switches are very greatly extended.

If desired, much of the control electronics can be included in a hybrid package or an integrated circuit chip. In essence, the control system consists of three simple units; namely, the bar magnet, the reed cluster and the solid state static electronic control components of the time delay circuit 94 and the energization circuit for the coils.

Figure 4:
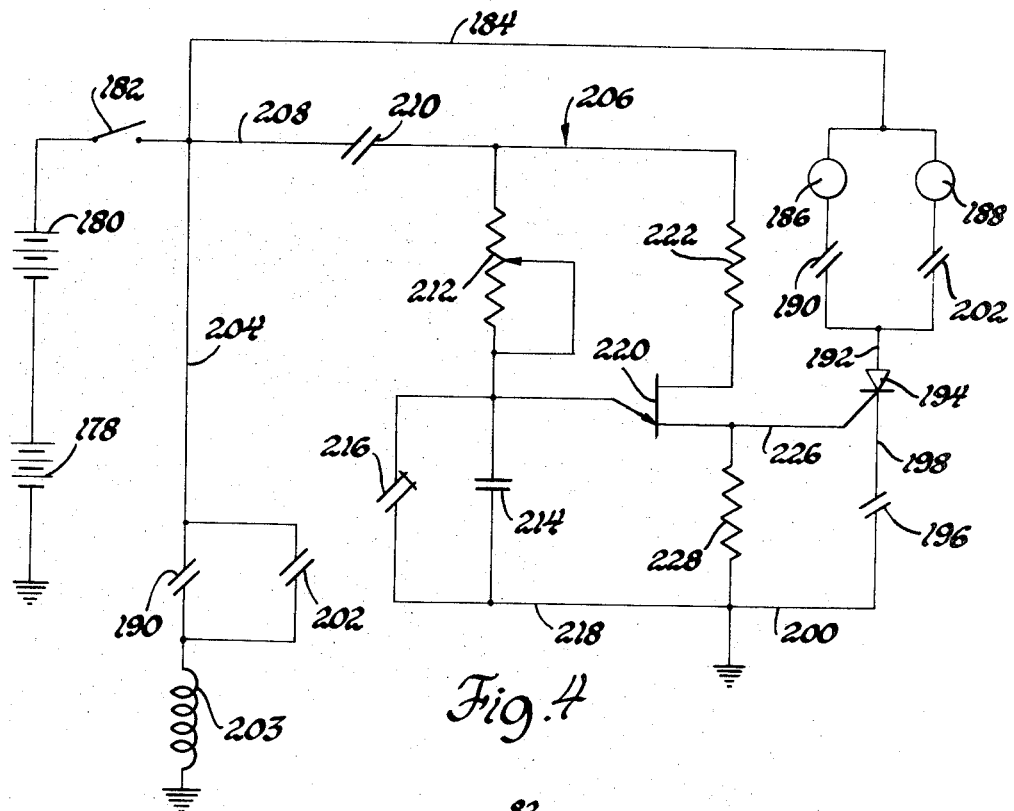
FIG. 4 is an electrical circuit diagram of another embodiment of control means for regulating the operation of the system in FIG. 1.

The preferred embodiment of the invention illustrated in FIGS. 1, 2 and 4 in one working embodiment was associated with load supporting devices which used a hydraulic fluid supply from a pump having a variable discharge pressure of 1,000 psi (maximum). When the system is in a leveling phase of operation, the final pressure in the levelizing unit is determined by the load imposed. When the desired level is reached, the leveling unit could have a maximum pressure of 1,000 psi or a minimum pressure of 120 psi. At 1,000 psi the leveling units have an upward lifting force of 300 lbs. each.

Starting from 120 psi, maximum lift of 1,000 psi can be attained, including time delay of 10 seconds in a maximum time of 0.5 minutes (30 seconds).

When the vehicle was in an exhaust phase of operation, the pressure in the variable volume chamber 42 was reduced from maximum 1,000 psig to a low of 120 psig in 20 seconds to return the vehicle to a level position following unloading of the vehicle in the amount of 500 lbs.

To accomplish these modes of operation in the working embodiment the circuit components had the following characteristics:

| Components | Ratings |
|---|---|
| Minireed switches 70 thru 78 | 0.5 a/switch amp rating and Manufacture Magnecraft |
| Coils 104, 114 | 30 ohms |
| Silicon control rectifiers 98, 100 | GE C106B1 |
| Transistor 102, 104 | ZN3054 RCA |
| Transistor 146 | ZN3053 RCA |
| Transistor 134 | ZN3053 RCA |
| Resistor 130 | 10 K ohms |
| Resistor 138 | 68 K ohms |
| Resistor 162 | 10 K ohms |
| Resistor 172 | 100 K ohms |
| Resistors 174, 176 | 47 ohms |
| Resistors 101, 103 | 100 ohms |
| Diodes 124, 126 | IN 4005 |
| Capacitor 142 | 100 MFD |
| Capacitor 156 | 100 MFD |

Another embodiment of the invention is illustrated in FIG. 3. In this embodiment the minireed switches 70 thru 78 are replaced by height responsive microswitches that sense the relative height relationship between the sprung and the unsprung mass of a vehicle. In one embodiment the system included, for test purposes, two 4.2 volt, series connected batteries 178, 180 which were connected through an on-off switch 182 to an input conductor 184 to coil energization circuits including a coil 186 for operating the fill valve 62 of a system like that in FIG. 1 and a coil 188 of an exhaust valve like valve 56 in the system of FIG. 1.

Coil 186 is connected through contacts 190 of a down control micro-switch. It in turn is connected by a conductor 192 to the anode terminal of a silicon controlled rectifier 194 which is electrically connected to one side of a normally open relay operated switch 196 by a conductor 198. The opposite side of the switch 196 is electrically connected by conductor 200 to ground.

The energization circuit for the coil 188 includes an up micro-control switch 202 connected by the conductor 192 to the aforementioned components leading through the conductor 200 to ground.

In this embodiment, the coil energization circuits are controlled by a coil 203 for energizing the relay control contacts 196. The coil 203 is electrically connected to the batteries 178, 180 through the on-off switch 182 by a conductor 204 which is electrically connected to the parallel connected down micro-control switch 190 and the up micro-control switch 202.

Additionally, the circuit includes a time delay capacitor discharge circuit 206. It includes a conductor 208 from the on-off switch 182 connected to one side of a pair of contacts operated by the relay coil 203. The contacts 210 are electrically connected to a charging circuit including a potentiometer 212 and a capacitor 214.

The resistance capacitance characteristics of the components 212, 214 determine the time delay required to charge the capacitor 214. Normally, the capacitor 214 is shunted by normally closed relay controlled contacts 216 which are electrically connected from the anode side of the capacitor 214 thence through a conductor 218 to ground. When the circuit is off, the contacts 216 will prevent the capacitor 214 from charging.

When the capacitor 214 is charged, it will produce a signal on the base emitter junction of a uni-junction transistor 220 to cause it to produce a signal from the power source through a resistor 222 across the collector emitter circuit of the uni-junction transistor 220 through a conductor 226 that is connected to the control terminal of the silicon control rectifier 194. A resistor 228 is connected between the base emitter junction of the uni-junction transistor 220 and the cathode terminal of the silicon control rectifier 194 to establish the controlling voltage thereacross at which point the coil energization circuits will be completed.

In this embodiment of the invention the micro-switches 190, 192 are arranged between the sprung and unsprung portions at the rear of the vehicle to sense the rear height thereof. When the vehicle is loaded, the up micro-switch is actuated. This will complete an energization circuit from the power source through the coil 203 to ground. It will cause the relay control contacts 210 and 196 to close and the relay contacts 216 to open. When this occurs, a charging circuit is completed through the potentiometer 212 and the capacitor 214. Following a predetermined 10 second time delay, the capacitor is charged to drive the uni-junction transistor 220 conductive thereby completing a control circuit from the power source through the closed contacts 210, the resistor 222, the collector-emitter junctions of the resistor 220 and the conductor 226 to the silicon control rectifier control terminal. The up micro-switch 202 is closed in the energization circuit for the coil 188 and as soon as the silicon control rectifier 194 is driven conductive, an energization circuit for the coil 188 is completed from the battery through coil 188, the micro-switch 202, the silicon control rectifier 194 and the closed contacts 196 to ground. At this point, the fluid circuit is conditioned to direct fluid from a power source to the pressurizable chamber of a supplemental load leveling device.

As the uplifting force of the load supporting device is increased, it eventually overcomes the added load and when the proper height is reached, the micro-switch 202 will de-energize the coil 203 to open contact 210, close contacts 216 and open contacts 196. This will discharge the capacitor and de-energize the solenoid coils. When the vehicle is unloaded, the down micro-switch senses that the unsprung portion of the vehicle is too high above its desired height relationship with respect to the unsprung mass portions thereof. At this point, the coil 203 of the relay control switches is again energized and the circuit is conditioned in the same way as it was when the vehicle was loaded except that the micro-switch 190 is closed and the micro-switch 202 is opened. Hence, following a 10-second time delay, which prevents ordinary road movement from operating the system, the coil 186 will be opened to cause the pressurizable control chambers of a leveling system such as that illustrated in FIG. 1 to exhaust.

While the embodiments of the invention as herein disclosed, constitute a preferred form, it is to be understood that other forms might be adopted.

What is claimed is as follows:

1. A vehicle leveling system comprising a load supporting device adapted to be connected between the sprung and unsprung masses of the vehicle for maintaining a predetermined height relationship therebetween; a pressurizable variable volume chamber in said load supporting device, pressurized fluid supply means for supplying pressure to said load supporting device for maintaining the predetermined height relationship, said fluid supply means having an inlet and an outlet, conduit means connecting the outlet to said chamber, a first solenoid operated valve connected between the fluid supply and the load supporting device maintained normally closed for holding a predetermined pressure within the load supporting device during its operation, a second solenoid operated valve connected in the outlet being maintained normally opened for diverting fluid from the outlet of the fluid supply back to the inlet thereof, first switch means operative to detect movement of the sprung mass of the vehicle toward the unsprung mass thereof to energize at least one of said solenoid operated valves for directing fluid from the pressure supply to the load supporting device to increase the pressure in the variable volume chamber thereof to return the sprung mass to its desired height relationship, second switch means operative when the sprung mass of the vehicle is a predetermined distance above the unsprung mass to energize at least another of said solenoid valves to connect the variable volume chamber of the load bearing device to direct fluid therefrom into the inlet of the fluid supply thereby reducing the pressure in the variable volume chamber for returning the sprung mass of the vehicle back to its desired predetermined height relationship.

2. A vehicle leveling system comprising: a load supporting device adapted to be connected between the sprung and unsprung mass of a vehicle including a variable volume pressurizable chamber, said load supporting device being operative to maintain a predetermined height relationship between the sprung and unsprung mass of a vehicle in accordance with he pressure in the variable volume chamber, a fluid supply system for directing pressurized fluid into the load supporting device, solenoid operated valve means connected between the fluid supply and the load supporting device for controlling flow of fluid pressure into the load supporting device and for controlling exhaust of pressurized fluid therefrom, switch means responsive to movement of the sprung mass of the vehicle toward and away from the unsprung mass thereof to condition said solenoid valve means to direct fluid to and from the load supporting device, means for energization of the solenoid valve means including a three terminal switching device and a relay operated switch, a coil for the relay operated switch, means for energizing said coil when the height responsive switch means are conditioned to control flow of pressurized fluid to and from the load supporting device, a time delay capacitor discharge circuit including a potentiometer and a normally closed relay operated switch controlled by said relay coil to charge the capacitor discharge circuit, means responsive to a predetermined charging of said circuit to direct a control voltage to the control terminal of said three terminal switching device to turn it on thereby to complete the solenoid energization circuit following the predetermined time delay.

3. A vehicle leveling system for maintaining a predetermined height relationship between the sprung and unsprung mass of a vehicle comprising: a load supporting device having a variable volume pressurizable chamber for supporting the sprung mass of a vehicle a predetermined height relationship with respect to the unsprung mass of a vehicle, a fluid supply system for directing pressurized fluid to the variable volume chamber, said fluid supply system including an inlet and an outlet and conduit means for directing fluid into the load supporting device and for exhausting fluid therefrom, solenoid operated valve means in said conduit means for controlling communication between the fluid supply and the variable volume chamber of said load supporting device, a plurality of reed switches supported on one of the sprung masses of the vehicle, a magnet movable with respect to said plurality of reed switches for operating said switches in a sequential relationship, first switch means for conditioning said solenoid operated valve means to supply fluid from the supply to the load supporting device when the vehicle is loaded, said first switch means being conditioned upon a first predetermined movement between the bar magnet and said sequentially operated reed switch means to direct fluid from the supply to the load supporting device to compensate for an additional load, second switch means for conditioning said solenoid operated valve means to exhaust fluid from the load supporting device, said bar magnet and said reed switch means being located in a second predetermined relationship to condition said second switch means to condition said solenoid valve means to exhaust fluid from the load supporting device when the sprung mass of a vehicle is moved a predetermined height relationship above the unsprung mass thereof, and means for delaying operation of said first and second power switch means upon movement of the bar magnet with respect to the reed switches produced by normal road movement between the sprung and unsprung mass of the vehicle.

4. A vehicle leveling system for maintaining a predetermined height relationship between the sprung and unsprung mass of a vehicle comprising: a load support device having a variable volume pressurizable chamber, said load support device having a first portion connected to the sprung mass of a vehicle and a second portion connected to the unsprung portion of a vehicle, said first and second portions extending and retracting with respect to one another upon changes in the volume of the pressurizable chamber, a fluid supply for directing pressurized fluid to the variable volume chamber, means including first and second solenoid operated valves for directing pressurized fluid from the supply to the variable volume chamber during a leveling operation and for exhausting fluid from the variable volume chamber during an exhaust phase of operation, a plurality of reed switches located in spaced relationship to produce a step-by-step sequence of control operations, an elongated bar magnet movable with respect to the reed switches upon relative movement between the sprung and unsprung masses of a vehicle for sequentially opening and closing the reed switches, means for energizing said valves including a bias switch for each of said solenoid valves, first and second of said reed switches being operated by said bar magnet to condition said bias switches to a first position upon a first predetermined movement of the sprung mass toward the unsprung mass, a control switch in each of said solenoid coil energization circuits, time delay circuit means for operating each of said control switches following a predetermined time delay, means including a third one of said reed switches operative when the first and second of said reed switches have been operated by said bar magnet to condition said timer means to initiate the time delay period of operation, said time delay circuit means being operative to delay energization of said control switches in response to ordinary road movements between the sprung and unsprung mass of a vehicle and operative to produce a signal following the time delay, means responsive to said signal to condition said control switches to operate said solenoid valves to direct pressurized fluid to said load supporting device to raise the vehicle, means for operating said solenoid valves to exhaust fluid from the variable volume chamber of the load supporting device including a separate pair of reed switches operated independently of the other reed switches in response to movement of the bar magnet when the sprung mass moves upwardly from the unsprung mass above a predetermined height relationship, one of said pair of reed switches operating one of said bias switches for said valves while the other bias switch is maintained opened, the other of said pair of reed switches conditioning said time delay means for controlling the conductivity of said control switches following a predetermined time delay to cause only one of said control switches to operate one of said valves whereby fluid is exhausted from the variable volume chamber to reduce the load support and lower the vehicle to a predetermined height relationship between the sprung and unsprung mass thereof.

* * * * *